F. YOUNG.
ANTISKID DEVICE FOR WHEELS.
APPLICATION FILED OCT. 19, 1911.
1,056,082.
Patented Mar. 18, 1913.
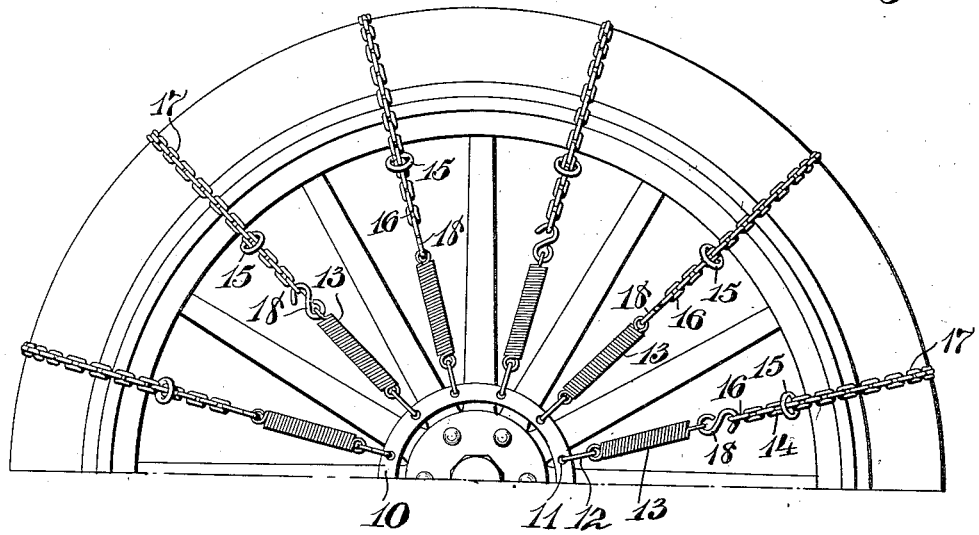
Fig. 1
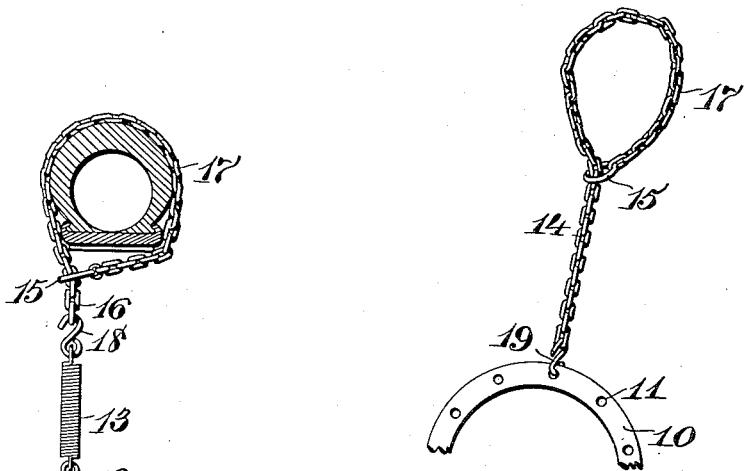
Fig. 2
Fig. 3
WITNESSES:
M. A. Johnson
W. E. Morton
INVENTOR
Frank Young,
BY
Wm. H. Caufield,
ATTORNEY

UNITED STATES PATENT OFFICE.

FRANK YOUNG, OF NEWARK, NEW JERSEY.

ANTISKID DEVICE FOR WHEELS.

1,056,082.

Specification of Letters Patent. Patented Mar. 18, 1913.

Application filed October 19, 1911. Serial No. 655,532.

*To all whom it may concern:*

Be it known that I, FRANK YOUNG, a citizen of the United States, residing at Newark, in the county of Essex and State of New Jersey, have invented certain new and useful Improvements in Antiskid Devices for Wheels; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

The invention is designed to provide a non-skidding device which is quickly attached to the tire and which consists of a collar from which project the individual chains or their equivalents which are arranged to embrace the tire. These individual chains equalize the strain on the wheel and on the collar, and if one of the chains becomes broken there is no liability of the whole device being removed from the wheel or flying from the wheel, which is very often the case in the type of non-skidding devices that pass around the rim of the wheel and which, when once broken, disengage the entire structure from the wheel.

The invention is illustrated in the accompanying drawing, in which—

Figure 1 is a side view of half a wheel showing my improved device. Fig. 2 is a section of Fig. 1, but with all the wheel removed except the rim, and with the entire collar shown in section, and Fig. 3 is a perspective view of a modified form showing a chain without the use of springs.

In the preferred form I use a collar 10 which can be of any shape so long as it is adaptable for the purpose, this collar being made rigid and which is illustrated in the form of a ring 10 which is provided with perforations 11 in which are fastened the ends 12 of springs 13, the ends 12 being in the shape of rings or any other attaching means. The springs 13 have secured to their outer ends the chains 14, each chain being adapted to pass around or embrace the tire and having a ring 15 on one end through which the other end 16 of the chain is adapted to pass so that a loop 17 is formed, this loop being shown in Figs. 1 and 2. The said "other end" which is passed through the ring 15 is preferably detachably secured to the end of the spring 13, and the preferred means is by the use of the hook 18, each of these chains and its spring extending individually from the collar and around the tire, so that if one of them breaks, the rigid collar still holds its place and the remaining chains remain seated where they are and the device is still in working order on the wheel. The springs 13 keep the chains taut and prevent the slipping of the device in a circumferential direction. Each chain when put on has its end 16 passed through the loop 15, is drawn tight, quickly hooked over the hook 18 and in a few minutes the device can be placed on the wheel, and by reversing this operation it can be just as quickly detached.

If desired I may dispense with the springs 13 and use the device as shown in Fig. 3 where the chain 14 is made long enough so that after it is made into the loop 17 it reaches to the collar 10 and is fitted over the hook 19 which engages one of the perforations in the spanner.

It will be understood that the collar is not limited to the relative size shown in the drawing, since it can be made larger or smaller as desired, and its size is sometimes regulated as to whether springs are to be used or not.

Having thus described my invention, what I claim is:—

1. The combination of a vehicle wheel, with a rigid collar, and a set of chains, each chain being provided with a ring on one end through which the other end of the chain is passed to form a loop embracing the tire of the wheel, the said other end being secured to the collar to hold the loop taut.

2. The combination of a vehicle wheel, with a rigid collar, a set of chains, each chain being provided with a ring on one end through which the other end of the chain is passed to form a loop embracing the tire of the wheel, the said other end being secured to the collar to hold the loop taut, and a spring in each chain to maintain the tension on the chain.

3. The combination of a vehicle wheel, with a rigid collar, a set of radially arranged springs secured to the collar, and a chain on each spring, each chain having a ring on one end through which the other end of the chain is passed to form a loop embracing the tire of the wheel, the said other end of the chain being secured to a spring.

4. The combination of a vehicle wheel, with a set of independent chains, each chain having a ring on one end through which the other end of the chain is passed to form a loop embracing the tire whereby tension on the chain tightens the loop, a rigid collar within the rim of the wheel, and a set of springs, each spring having a hook on its end to engage the said other end of each chain whereby each chain is put under a tension said spring being secured to the collar.

In testimony, that I claim the foregoing, I have hereunto set my hand this 18th day of October, 1911.

FRANK YOUNG.

Witnesses:
Wm. H. Camfield,
M. A. Johnson.